UNITED STATES PATENT OFFICE.

WILLIAM KELLY, OF WHITE DEER TOWNSHIP, PENNSYLVANIA.

IMPROVEMENT IN THE MANUFACTURE OF SADDLE-TREES.

Specification forming part of Letters Patent No. 209, dated May 30, 1837.

*To all whom it may concern:*

Be it known that I, WILLIAM KELLY, of White Deer township, Union county, Pennsylvania, have invented an Improved Mode of Manufacturing Saddle-Trees of all Descriptions; and I do hereby declare that the following is a full and exact description thereof.

My improved mode of manufacturing saddle-trees consists in the substitution of rawhide for the wood usually employed for that purpose, to effect which I proceed in the following manner: After the hair has been removed from the hide in the usual way, and the hide is properly broken, I draw or strain it, while wet, either over a wooden saddle-tree or over a mold properly shaped and prepared for that purpose, where it is to remain until it is perfectly dry and hard. Having in this way brought two or more such pieces of hide into the proper form, I unite them together at their edges by means of rivets or otherwise, preferring, however, the employment of rivets to any other mode. The pieces of hide are of course cut to the proper size and shape for the intended purpose. I sometimes form the tree or foundation of the saddle of a single piece of rawhide, in which case I turn the edges of the hide over all around the outer and inner edges of the tree and rivet through the double thickness. To this foundation or tree the irons usually employed may be fastened as to trees of wood. Strips of spring-steel, also, may be riveted on wherever it may be deemed requisite, so as to increase the stability and elasticity of the whole. I usually affix such a spring all around the under side. After my tree thus made has received its proper form and is ready for covering I give to it a thick coating of my good water-proof varnish—such a shellac, copal, or gum-elastic. In finishing the saddle, any of the well-known modes of procedure may be adopted, according to the fancy or judgment of the workman.

All I claim as my invention is—

The forming of the trees or foundations for saddles of all descriptions from rawhide, instead of using wood or other material for that purpose, as herein fully set forth.

WILLIAM KELLY.

Witnesses:
 THOS. P. JONES,
 W. THOMPSON.